United States Patent [19]

Johnson et al.

[11] 3,805,857
[45] Apr. 23, 1974

[54] VAPORIZABLE FUEL TRANSFER SYSTEM AND SEAL THEREFOR

[75] Inventors: Everett M. Johnson; Robert S. Wetmiller, both of Fishkill, N.Y.

[73] Assignee: Texaco Inc., New York, N.Y.

[22] Filed: Nov. 17, 1972

[21] Appl. No.: 307,704

[52] U.S. Cl.................. 141/287, 141/198, 239/569
[51] Int. Cl........................... B67d 5/372, B67d 5/2
[58] Field of Search......... 141/45, 52, 59, 287, 312, 141/392; 239/569

[56] References Cited
UNITED STATES PATENTS
2,908,299   10/1959   Gosselin............................. 141/287
3,581,782   6/1971   Onufer................................ 141/59

Primary Examiner—Robert S. Ward, Jr.
Attorney, Agent, or Firm—T. H. Whaley; C. G. Ries

[57] ABSTRACT

A fuel dispensing nozzle and system adapted to be manually actuated for transferring a vaporizable fuel from a source thereof, into the tank of a motor vehicle, boat, airplane, or the like. To avoid a discharge of fuel vapors into the atmosphere during the transfer operation, an expandable bladder or seal member is carried on the fuel dispensing nozzle to form a controllably regulated seal with the tank.

The bladder or seal member is actuated by means of a valve communicated with an inflating medium and cooperative with a fuel flow control valve. Thus, an operator can sequentially form the desired seal with a fuel tank, and thereafter commence fuel flow into the tank. Subsequently, he will discontinue said fuel flow, then collapse the seal, all without discharge of fuel vapors from the tank into the atmosphere.

5 Claims, 2 Drawing Figures

VAPORIZABLE FUEL TRANSFER SYSTEM AND SEAL THEREFOR

BACKGROUND OF THE INVENTION

During the fueling of a motor vehicle such as an automobile, boat, airplane or the like, a vaporizable fuel in liquid phase is normally introduced to the fuel tank in a pressurized stream. Although this fuel tank is usually empty, or only partially filled prior to the filling operation, it will normally contain vapors from the residual fuel in the tank.

As liquid fuel is introduced to the partially empty tank, said residual vapors will normally be forced from the tank usually through the filling spout or tube. Further, said vapors will be passed directly into the atmosphere.

It is known that in relatively congested areas, there is a continuous passage of gasoline fumes into the atmosphere during vehicle fueling operations. Under natural atmospheric conditions said fumes, as well as other discharged smoke and gas, can precipitate a health hazard.

Toward overcoming this developing problem, states and municipalities have attempted to legislate against air polluting acts with varying degrees of success. As a matter of practicality it is becoming more essential that with the increased employment of volatile automobile fuels in vehicles utilizing internal combustion engines, some form of compatible system must be developed. Further, such a system must either confine the fuel to a completely closed circuit, or otherwise preclude passage of the vapors from the fuel circuit to the atmosphere.

In the system presently disclosed to illustrate the invention, an automotive filling or service station utilizes the system for transferring liquid fuel to passenger vehicles, trucks and the like. In such an installation, the station's fuel tanks are normally buried beneath the earth and the liquid fuel periodically pumped therefrom into the tank of a vehicle.

To avoid leakage of fuel vapors from a vehicle tank during the fuel transfer operation, the dispensing nozzle includes an inflatable seal member that, when in the expanded position, will sealably engage the vehicle fuel tank filler tube in a manner to form a vapor-tight annular seal therewith. Further, said seal member will exert a sufficient radial force along the seal as to retain the nozzle in place. Thus, as a fueling operation is carried out, residual vapors forced from the tank will be confined to the fuel system and returned to the fuel source, or otherwise passed to an alternate receptacle.

The means for establishing the desired vapor barrier between engaged nozzle and tank, includes a pressurized source of an inflating medium such as air or other gas which is communicated with the inflatable seal member. Valve means interposed between said respective source and inflatable seal is manually operable to introduce a pressurized stream of an inflating medium to the seal, and further to vent the latter at such time as the seal is to be collapsed.

Both the fuel control valve, as well as the seal control valve are commonly actuated in a manner to establish a sequence of operations whereby the seal is first formed and fuel flow regulated. Thus, during the inflow of liquid fuel to the tank, vapors which are displaced from the latter can be conducted away to avoid passage thereof to the atmosphere.

DESCRIPTION OF THE DRAWINGS

Referring to the drawings, FIG. 1 illustrates diagrammatically a system of the type contemplated in which a fuel source 10 as well as a pressurized inflating medium source 11 are provided. Normally, the installation which will be hereinafter referred to as an automotive service station, will include at least one and usually a plurality of underground tanks 12 holding gasoline or other vaporizable fuel 10. Similarly, the service station is provided with a source of the inflating medium which most commonly will include an air compressor connected to a source of power for the purpose of inflating tires and the like.

Figure 1:
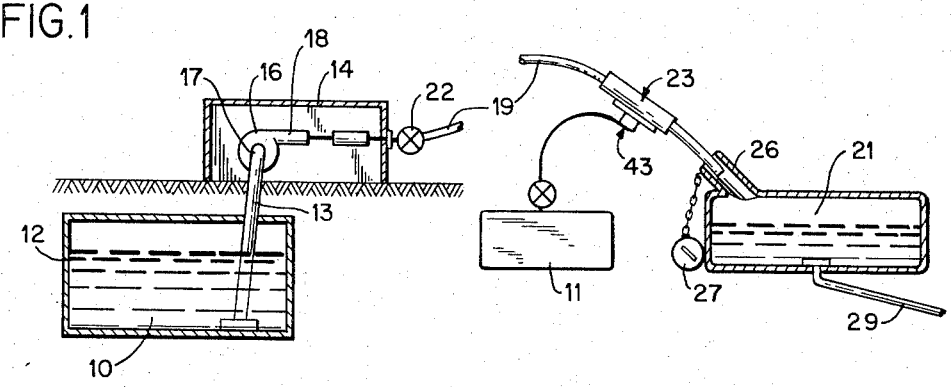
FIG. 1 illustrates an environmental view in partial cross section of the instant invention.

In the usual manner, fuel holding tanks 12 are provided with means to withdraw the liquid fuel therefrom while simultaneously measuring the amount withdrawn. Thus, tanks 12 include an elongated conduit 13, the lower inlet end thereof being positioned adjacent to the tank lower side. Said conduit 13 extends to a point above the ground and is communicated with a selectively operable pumping means 14.

Fuel pumping means 14 may embody essentially an electrically operated or driven pump 16 having an inlet side 17 communicated with said conduit 13. Pump discharge side 18 is further communicated with an elongated flexible hose 19 of sufficient length to reach the fuel tank 21 of a standing vehicle. Flow measuring and control means such as valve 22 are interposed in the hose line 19 to facilitate the fuel transfer operation.

A fuel dispensing nozzle 23 depends from the remote end of hose 19 and includes a manually operable valve means 28. Said valve means 28 functions upon actuation to regulate the fuel flow velocity through dispensing nozzle 23.

The shown pumping means, characteristic of service station installations, includes valve 22 which is usually manually operable to initiate action of pump 16 in withdrawing liquid fuel from tank 12. Fuel tank 21 is positioned within the vehicle in a manner to be readily accessible from a point external to the latter. Thus, said tank 21 is provided with a filler tube or spout 26 extending from the tank 21 interior, and to an exterior side or rear of the automobile. A cap 27 is removably fixed to the filler tube 26 upper end and serves as a closure to the tank. A discharge line 29 connected to the tank 21 lower end further embodies a pump or similar means for initiating fuel flow from said tank when the automobile engine is operated.

Figure 2:
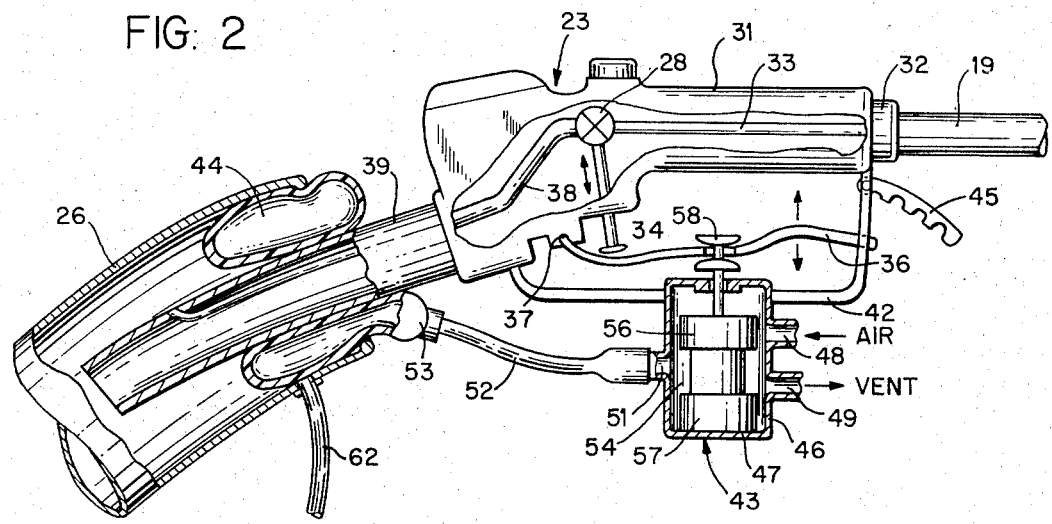
FIG. 2 is an enlarged segmentary view in partial cross section of the fuel dispensing nozzle shown in FIG. 1.

Referring to FIG. 2, discharge tube 39 of dispensing nozzle 23 depending from the extreme end of hose 19, is normally slidably received and then held within cylindrical filler spout or opening 26. Thus, upon actuation of valve 28 to an open position, fuel flow will be commenced from storage tank 12, into the vehicle tank 21.

Said dispensing nozzle 23 basically embodies a central body 31 having an inlet 32 communicated with the source of fuel 10 through hose 19, pump assembly 14 and conduit 13. Said body 31 further includes a first passage 33 having valve means 28 disposed therein. The latter is provided with an elongated plunger 34 which is slidably received in the body and connected to a manually operable and pivotally connected lever 36.

To initiate a flow of liquid through body passage 33, lever 36 is urged upwardly into a displaced position about pivot point 37, thus causing actuating plunger 34 to adjust control valve 28 to an open position. Fuel flow through said valve 28 will enter downstream passage 38 and thence pass into discharge tube 39.

Discharge tube 39 is generally formed of cylindrical cross section and adapted to be slidably received within the passage defined by cylindrical fuel tank filler tube 26. One end of said discharge tube 39 is communicated with the nozzle body passage 38. Said discharge tube 39, is further of sufficient length to be removably inserted into the tank filler tube 26 while maintaining a tightly engaged relationship of the two members during the fuel transfer period by means of inflatable seal member 44. In addition, dispensing nozzle 23 includes a passage 60 which communicates with filler tube 26 and provides for passage of vapors from tank 21 back to the fuel source 12 or to a collecting receptacle.

Body 31 includes a lower stationary bracket 42 fastened at both ends, and extending from the body forward end to a point adjacent the body connection with hose 19. Said bracket 42 serves the dual function of protecting actuating lever 36, and also of supporting control valve 43 communicated with inflatable sealing member 44.

A lever positioning means 45 is pivotally connected at one end of said bracket 42, and is provided with a plurality of grooves along the other side, adapted to receive the remote end of said lever 36. Then said lever can be preset in a manner to establish a desired flow of fuel through dispensing nozzle 23.

Valve 43 is shown schematically and can within the ambit of the invention, embody a number of similarly constructed valves adapted to be actuated whereby to achieve the desired sequential inflow and venting of the inflating medium from source 11. The instant valve 43 includes however a casing 46 having a central plunger 47 slidably positioned within the latter. Casing 46 includes an inlet 48 communicated with a pressurized source of air 11, and with a vent port 49. An outlet port 51 is communicated through a connector conduit 52 with inflating connection 53 of seal member 44.

Sliding plunger 47 of said valve 43 includes a generally cylindrical body having an annular cavity 54 formed about the central portion thereof. The respective upper and lower ends 56 and 57 of said body slidably and sealably register with contiguous walls of casing 46 to selectively cover the respective air inlet 48 and vent port 49, depending on whether seal means 44 is to be inflated or deflated.

The upper end of plunger 47 includes a connector head 58 adapted to operably engage a slot formed in actuating lever 36 such that the plunger will be adjusted concurrently with actuation of lever 36 to control fuel flow.

Thus, with actuating lever 36 in the lower position, fuel flow control valve 28 will be completely closed, thereby obviating flow through dispensing nozzle 23. Similarly, the vent port 49 of said valve 43 will be open to vent outlet port 51 of the inflatable sealing means 44 to the atmosphere.

Upon actuation of lever 36 about its pivotal point 37, to a first position, plunger 47 will be initially raised to expose the inlet port 48, close exhaust port 49, and initiate a flow of compressed air through said valve 43 and into inflatable seal member 44. Thereafter, with the seal member expanded, further upward displacement of said lever 36 beyond said first position will initiate fuel flow from source 10 through valve 28, and into fuel tank 21.

After inflation and while fueling of tank 21 is underway, sealing member 44 also serves to hold nozzle discharge tube 39 firmly within tank filler tube 26. With an automatic shutoff nozzle 31 shown, when fueling is complete and lever 36 is tripped to close fuel flow valve 28, valve plunger 47 remains in position to continue inflation of seal member 44, thereby continuing to hold nozzle discharge tube 39 in place in tank filler tube 26.

The service station operator may then at his convenience, and after topping off fuel tank 21, disengage nozzle discharge tube 39 from tank filler pipe 26 by manually depressing valve connector head 58. This vents outlet port 51 to the atmosphere through vent port 49 permitting seal member 44 to deflate and permit removal of nozzle discharge tube 39 from tank filler pipe 26.

A proper sealing effect is achieved at discharge tube 39 by providing sealing member 44 with a sufficient degree of resiliency to afford the desired tight fit. Said member 44 preferably adopts the form of an inflatable torus or bladder. As seal member 44 expands, it will also effectively block vent line 62, commonly found in filler tube 26 of older cars thereby also preventing escape of fuel vapors to the atmosphere from that source.

The inner diameter of said member 44 is sufficient to permit a tight, yet sliding fit thereof along the external surface of discharge tube 39. Expandable member 44 can thereby be readily replaced in the event it becomes punctured or otherwise damaged.

Said sealing member 44 can be formed of a fuel resistant material such as neoprene or similar elastomeric material adapted to retain its resiliency in spite of extreme temperature changes.

Other modifications and variations of the invention as hereinbefore set forth may be made without departing from the spirit and scope thereof, and therefore, only such limitations should be imposed as are indicated in the appended claims.

We claim:

1. A nozzle having a flow passage therein including a discharge tube communicated through said flow passage with a source of vaporized fuel for conducting fuel into a tank therefor, the latter including a filler spout adapted to removably receive said discharge tube of said nozzle, first valve means in said flow passage having an actuating lever operably positioned to regulate fuel flow through said first valve means and to said discharge tube, an inflatable seal element adjustable between inflated and deflated conditions, said element being carried on said discharge tube and adapted to slidably register within said filler spout when said seal element is in the deflated condition, second valve means communicating said inflatable seal element with a source of an inflating medium, said second valve means being operably connected to said actuating lever to regulate the flow of said inflating medium through said second valve means, whereby to regulate the condition of said inflatable seal element, said second valve means including a single movable element being adjustable to regulate the flow of inflating medium through said second valve means, said movable element being operably connected to said first valve means actuating lever to maintain continuous engagement with the latter through all positions of said lever.

2. In an apparatus as defined in claim 1, including automatic fuel shut off means carried on said nozzle and adaptable to engage one end of said actuating lever, said elongated actuating lever being pivotally connected at one end to said nozzle, and having a remote other end, said valve means being operably connected to said actuating lever at a point intermediate said respective pivoted and remote ends thereof.

3. A dispensing nozzle for transferring a vaporizable liquid from a source thereof, to a tank therefor having filler opening, said nozzle including;

a discharge tube adapted to register in said tank filler opening whereby to conduct a stream of said liquid into said tank, means within said discharge tube and extending through said nozzle for receiving a stream of air and vapors from said liquid as the latter is introduced to said tank, an inflatable seal element carried on said discharge tube being expandable to engage contiguous walls of said filler opening and form an annular seal with the latter, conduit means communicating said inflatable seal element with said discharge tube, and valve means having a common elongated actuating lever being operable to regulate flow of an inflating medium to and from said inflatable seal element to pass liquid into said tank, and to permit passage of air and vaporized fumes from said tank into said dispensing nozzle.

4. In an apparatus as defined in claim 3, wherein said valve means is operable to sequentially inflate said seal means to engage said filler opening, and to thereafter commence flow of liquid into said tank.

5. In an apparatus as defined in claim 3, wherein said valve means includes a first valve communicating said discharge tube with a source of said liquid, second valve means communicating said inflatable seal with a source of pressurized gas, and actuating means operably connected to said respective first and second valves to actuate the valves and regulate flow therethrough.

* * * * *